(12) United States Patent
Wang et al.

(10) Patent No.: US 10,475,551 B2
(45) Date of Patent: Nov. 12, 2019

(54) ELECTRICAL COUPLER, POWER CONVERTER, AND METHOD

(71) Applicant: GE Energy Power Conversion Technology Ltd., Rugby, Warwickshire (GB)

(72) Inventors: Jun Wang, ShangHai (CN); Fan Zhang, ShangHai (CN); Richard S. Zhang, Paris (FR); Yingqi Zhang, ShangHai (CN); Brian Eric Lindholm, Salem, VA (US); Lin Lan, ShangHai (CN); Yazhu Zhao, ShangHai (CN)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 516 days.

(21) Appl. No.: 15/139,781

(22) Filed: Apr. 27, 2016

(65) Prior Publication Data

US 2016/0315530 A1 Oct. 27, 2016

(30) Foreign Application Priority Data

Apr. 27, 2015 (CN) .......................... 2015 1 0206919

(51) Int. Cl.
| | |
|---|---|
| *H01B 5/16* | (2006.01) |
| *H01B 1/02* | (2006.01) |
| *H01G 4/33* | (2006.01) |
| *H01G 4/35* | (2006.01) |
| *H02M 1/12* | (2006.01) |
| *H02M 7/48* | (2007.01) |

(52) U.S. Cl.
CPC ............... *H01B 5/16* (2013.01); *H01B 1/026* (2013.01); *H01G 4/33* (2013.01); *H01G 4/35* (2013.01); *H02M 1/126* (2013.01); *H02M 7/48* (2013.01)

(58) Field of Classification Search
CPC ... H05K 9/00; H05K 7/00; H05K 1/02; H05B 1/02; H05B 6/10; H05B 6/06; H05B 37/02; H02H 9/00; H02H 3/00
See application file for complete search history.

(56) References Cited

U.S. PATENT DOCUMENTS

| | | | |
|---|---|---|---|
| 1,561,270 A | 11/1925 | Miner | |
| 7,265,993 B1 * | 9/2007 | Slone | ................... H05K 1/0234 361/760 |
| 2014/0169049 A1 * | 6/2014 | Chandrasekaran | . H02M 1/4225 363/84 |

FOREIGN PATENT DOCUMENTS

| | | |
|---|---|---|
| CN | 202608143 U | 12/2012 |
| JP | 62164897 A | 7/1987 |
| JP | 62164898 A | 7/1987 |
| JP | 62164899 A | 7/1987 |

(Continued)

OTHER PUBLICATIONS

European Search Report and Opinion issued in connection with corresponding EP Application No. 16167249.8 dated Sep. 30, 2016.

(Continued)

*Primary Examiner* — Nguyen Tran
(74) *Attorney, Agent, or Firm* — Wood IP LLC

(57) ABSTRACT

An electric coupler includes a body, a first electrical path through the body having a first resistance to electric current within a first frequency range and a second electrical path through the body having a second resistance to electric current within a second frequency range.

20 Claims, 9 Drawing Sheets

(56) References Cited

FOREIGN PATENT DOCUMENTS

| JP | 62164900 A | 7/1987 |
|----|------------|--------|
| JP | 06309958 A | 11/1994 |

OTHER PUBLICATIONS

Zhang et al., "Numerical Simulation of Hydrostatic Extruding Cu/Al Bimetal Clad through Equal-Strain Contour Concave Die", Materials Science Forum, vol. No. 575-578, pp. 792-798, 2008.

\* cited by examiner

|  | Bi-metallic busbar (Ohm) | Busbar with discrete Resistance (Ohm) |
|---|---|---|
| DC resistance | 90n | 3.7m |
| Resistance @ 7kHZ | 3.7m | 3.7m |
| Power loss of positive busbar (w) | 410 | 1520 |
| Power loss of neutral busbar (w) | 800 | 1560 |

ELECTRICAL COUPLER, POWER CONVERTER, AND METHOD

TECHNICAL FIELD

Embodiments of the subject matter disclosed herein generally relate to an electrical coupler, and more particularly, to a bus bar for a power converter.

BACKGROUND

Modern power converters incorporate a variety of electrical components to convert energy from an electrical source into usable electrical power for a load. During the power conversion process, some of these components may introduce harmonic excitations to the converter's framework of electrical couplers and capacitors. In order to prevent potentially damaging resonances from occurring within the converter, the response of the couplers and capacitors to these excitations may have to be explicitly damped with resistors. However, heat generated by damping is often significant and is another potential source of damage to the converter. Accordingly, damping is often accompanied by additional cooling equipment. Thus, damping and cooling a power converter increases costs and decreases converter efficiency. These measures also compromise converter power density, particularly when liquid cooling is implemented.

What is needed then is a component capable of introduction to a power converter or other electrical system, that provides adequate system damping while increasing efficiency and reducing heat generation.

SUMMARY OF THE INVENTION

According to an exemplary embodiment, an electric coupler includes a body, a first electrical path through the body having a first resistance to electric current within a first frequency range, and a second electrical path through the body having a second resistance to electric current within a second frequency range.

According to another exemplary embodiment, a power converter may include an input stage configured to receive alternating or direct current, an output stage configured to output alternating or direct current and a coupler between the input stage and the output stage. The coupler may include a first body, a first electrical path through the first body having a first resistance to electric current within a first frequency range and, a second electrical path through the first body having a second resistance to electric current within a second frequency range.

According to another exemplary embodiment, a method of conducting electrical current through a bus bar of a power converter can include conducting electric current within a first frequency range through a first layer of the bus bar at a first resistance and conducting electric current within a second frequency range through a second layer of the bus bar at a second resistance.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 shows converter thermal test results of a conventional bus bar compared with a bus bar in series with the electrical coupler of FIG. 4.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of power converter systems. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
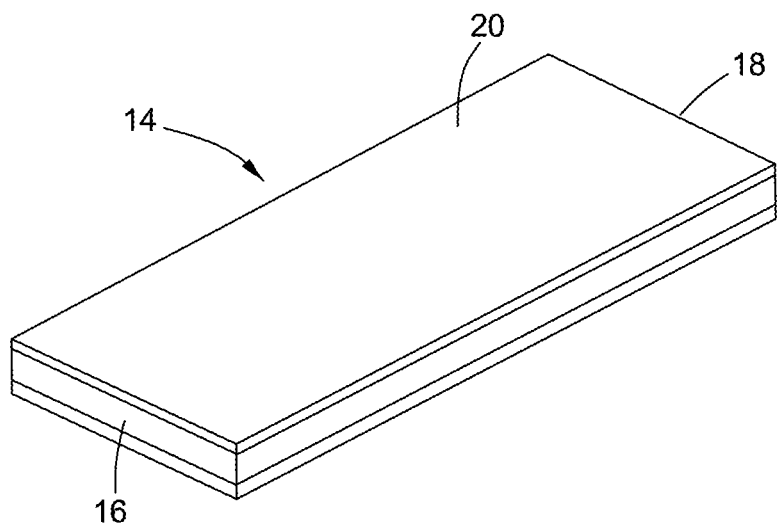
FIG. 1 is a perspective view of an electrical coupler according to an exemplary embodiment.
Figure 2:
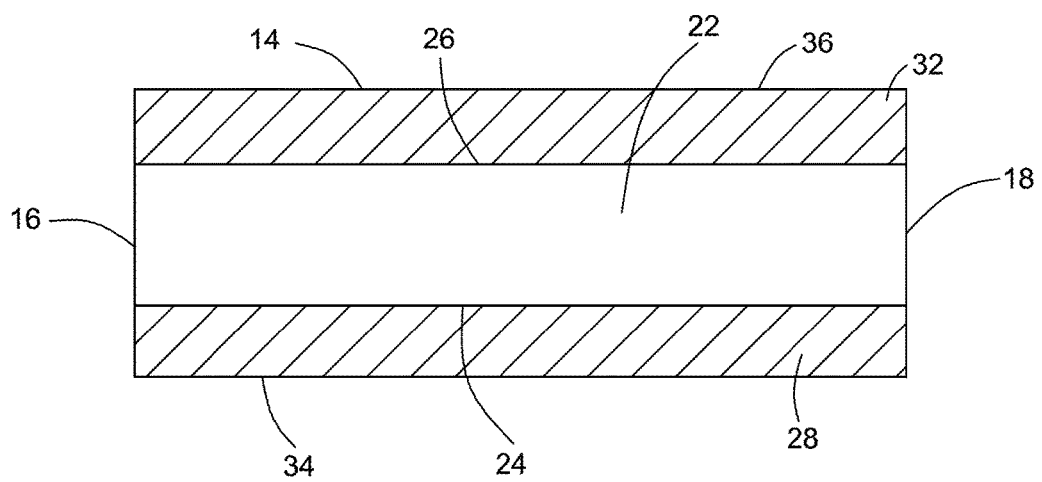
FIG. 2 is a cross-sectional view of the electrical coupler shown in FIG. 1.

An exemplary embodiment of an electrical coupler 14 according to the present invention is shown in FIGS. 1 and 2. Therein, an electrical coupler 14 defines an elongated body 20 having a rectangular cross section. Elongated body 20 includes an inner layer 22 and two outer layers 28 and 32.

Inner layer 22 is made of a first electrically conductive material such as a metal or a metallic alloy, and outer layers 28 and 32 are made of a second electrically conductive material, such as a metal or a metallic alloy. The material of inner layer 22 may have a higher electrical conductivity than outer layers 28 and 32. Layers 22, 28, and 32 are electrically connected at the ends 16 and 18 of body 20 such that current entering body 20 may migrate to any of layers 22, 28, and 32. Layers 22, 28, and 32 may also be electrically connected along the interfaces 24 and 26 between the layers to allow for further migration and control of current flow across layers 22, 28, and 32.

As may be appreciated from FIGS. 1 and 2, coupler 14 provides at least two electrical paths between the longitudinal ends 16 and 18. Specifically, a first electrical path is provided through the first material of inner layer 22 and a second electrical path is provided through the second material of outer layers 28 and 32.

Even though two electrical paths are provided by layers 22, 28, and 32, the electric conductivity and electrical interconnection of layers 22, 28, and 32 at ends 16 and 18 allows electrical body 20 to behave similarly to a traditional single material conductor. Specifically, higher frequency components of the current flowing within electrical body 20 may migrate, according to the so-called skin effect, from layer 22 to the outer layers 28 and 32.

Also, high frequency current components travelling through body 20 will cause an inductance within each of the outer layers 28 and 32. For example, and with reference now to FIG. 4, the inductance of each of first body 320 and second body 340 may be used to further force the migration of higher frequency components of the current toward the outer surface of layers 328, 332, 348 and 352 according to the so-called proximity effect. Therefore, reducing the distance between first body 320 and second body 340 will cause a corresponding reduction in the skin depth of the high frequency current within outer layers 328, 332, 348 and 352.

In addition to controlling skin effect and skin depth of electrical current according to frequency, each layer 22, 28, and 32 may also be configured with different materials, geometric dimensions, resistivity, and magnetic permeability to control or process longitudinal current flow through body 20 from end 16 to end 18.

In particular, each layer of electrical coupler 14 may be configured to provide a frequency specific resistance. As discussed above, the skin effect and the proximity effect will tend to force higher frequency components of current to the outer surfaces of layers 28 and 32. Thus, layers 28 and 32 may be configured, for example, with a higher resistance such that current having a frequency above a certain predetermined magnitude will pass relatively freely from end 16 to end 18 within layers 28 and 32. More specifically, the material, geometric dimensions (length, width and height), resistivity, and magnetic permeability of layers 28 and 32 may be configured such that almost all of the current within a preselected frequency range will flow in layers 28 and 32. Layers 28 and 32 may be further configured to provide a resistance to this current or to allow this current to pass relatively freely through body 20. Similarly, the material, geometric dimensions (length, width and height), resistivity, and magnetic permeability of layer 22 may be configured such that almost all of the current within a lower preselected frequency range will flow through layer 22. Layer 22 may be further configured to provide a resistance to this current or to allow this current to pass relatively freely through body 20. The preselected frequency range of layers 28 and 32 and the preselected frequency range of layer 22 may overlap to provide body 20 with an overall resistance which may behave in a predictable manner, e.g., linearly, with frequency.

The versatility of coupler 14 is enhanced by the rectangular cross section of each of layers 22, 28, and 32 which provide adequate surface area for optimizing skin effect, skin depth, and the proximity effect on current flowing through coupler 14 while also providing low volume for reduced material usage. Further, in embodiments where the interface between layers 22, 28, and 32 includes an air gap, manufacturing and assembly of connector 14 can be readily performed using a variety of manufacturing techniques without concern for whether or not electrical connectivity is maintained along interfaces 24 and 26. Exemplary methods of connecting second layer 28 and third layer 32 to first layer 22 include chemical processes such as coating, adhering, welding, brazing, or soldering and/or mechanical processes such as clamping, fastening or banding.

Figure 3:
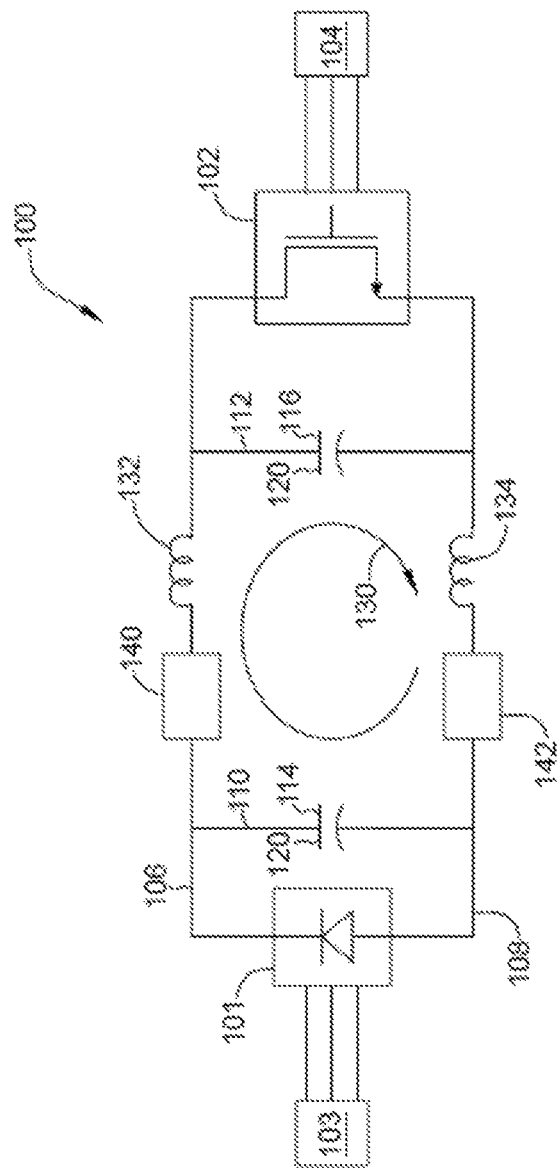
FIG. 3 is a schematic of a power converter.

Electrical coupler 14 may provide particular advantage in a power converter. FIG. 3 shows a schematic diagram of a power converter circuit 100. Power circuit 100 includes an input stage 101 that may receive fixed frequency AC current from AC source 103 and an output stage 102 that may provide variable frequency AC current to an AC load 104. Input stage 101 may include a three-phase rectifier (not shown) and output stage 102 may include six phase legs that contain metal oxide semiconductor field effect transistors (MOSFETs), insulated gate bipolar transistors (IGBTs), integrated gate commutated thyristors (IGCTs) and/or any other power device suitable for use in pulse width modulation.

The input stage 101 is connected to the output stage 102 by first and second DC buses 106 and 108. First and second capacitor legs 110 and 112 extend between first and second DC buses 106 and 108 and include capacitor banks 114 and 116.

In operation, a current loop 130 in power converter 100 is formed by first capacitor leg 110, first bus 106, second capacitor leg 112, and second bus 108. Each bus 106 and 108 may behave as an inductor 132 and 134 and, assuming a balanced inductance provided by each bus, may be said to have an inductance ½L. Similarly, first and second capacitor banks 114 and 116 may be said to each have a capacitance ½C. Accordingly, the series LC circuit formed by current loop 130 has an inductance L and capacitance C and the resonant frequency of the LC circuit in the power converter 100 is provided by the Equation:

$$f = \frac{1}{2\pi\sqrt{LC}}$$

During operation, the pulse width modulated power signal created by the aforementioned components in the first stage 101 of the power converter 100 may create current oscillations at or near the resonant frequency. In order to prevent potential damage caused by resonant operation of power converter 100, a pair of resistors 140 and 142 may be incorporated to power converter 100 such that a balanced RLC circuit is formed with each resistor having a resistance ½R. The inclusion of resistors 132 and 134 within the current loop 130 allows for current oscillations at or near the resonant frequency to be damped thereby preventing damage to the power converter.

For systems with very high resonant frequencies, the intrinsic resistance of normal bus bars may be enough to provide sufficient damping. However, bus bars 106 and 108 may be of sufficient length that the addition of explicit damping resistors will be required. For example, the first and second stages 101 and 102 may be located in separate equipment cabinets.

Of course, a larger damping resistance may be implemented to the current loop by the inclusion of a highly resistive conductor, such as stainless steel, in series with each bus bar. However, with increased power levels and increased bus bar lengths, the loss in energy from this damping resistance becomes significant. Moreover, this lost energy is expressed as heat which, as previously discussed, may require extensive accommodations to ensure effective heat transfer away from sensitive components. For example, and as previously mentioned, some power converters may be outfitted with liquid cooling arrangements in order to provide sufficient heat transfer capacity for continuous high load operation. In addition to the difficulty of dealing with the heat coming from a highly resistive conductor, the damping resistors may interfere with the conduction of low-frequency current flow desired for optimum power converter operation.

In order to reduce and potentially obviate the need for such cooling, and to facilitate the delivery of low-frequency current, a coupler according to an embodiment of the present invention may be implemented in series to each bus bar 106 and 108 to provide resistance to components of the current having a frequency at or near the resonant frequency f of the power converter 100 while allowing remaining lower-frequency currents to pass through relatively unimpeded.

Figure 4:
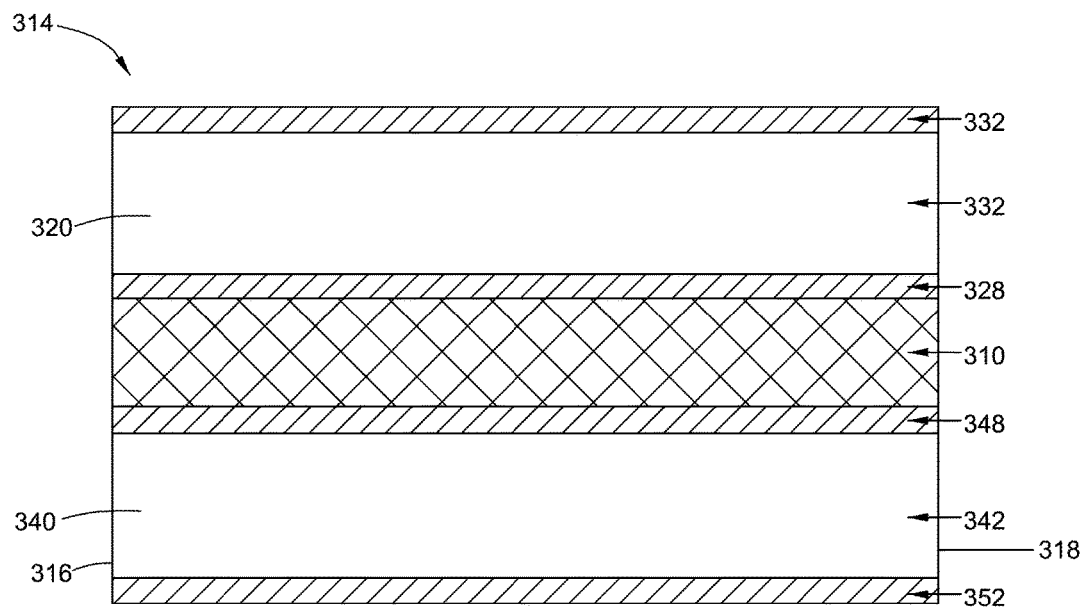
FIG. 4 is a cross-sectional view of an electrical coupler according to another exemplary embodiment.

FIG. 4 shows an embodiment of a dual-conductor coupler 314 appropriate for inclusion in a power converter, such as power converter 100 shown in FIG. 3. Coupler 314 includes first and second electrical bodies 320 and 340 separated by an insulator 310. The electrical body 320 includes a pair of outer layers 328 and 332 electrically connected to an inner layer 322. The electrical body 340 includes a pair of outer layers 348 and 352 electrically connected to an inner layer 342. As will be further described below, each of the electrical bodies 320 and 340 is also secured to an insulator 310 to form coupler 314.

The electrical body 320 may be formed by pressing the outer layers 328 and 332 against the inner layer 322 and fastening the layers 328, 332 and 322 together at the ends 316 and 318, and the electrical body 340 may be formed by pressing the outer layers 348 and 352 against the inner layer 342 and fastening the layers 348, 352 and 342 together at the ends 316 and 318. Each of the electrical bodies 320 and 340 may then be adhered, fastened or otherwise secured to insulator 310.

A prototype coupler 314 has been configured with outer layers 328, 332, 348 and 352 made of steel and inner layers 322 and 342 made of copper. The high permeability of steel material allows high frequency current to be concentrated into a very thin skin depth within the outer layers 328 and 332 of body 320 and the outer layers 348 and 352 of body 340. Also, since steel has a resistivity approximately ten times larger in magnitude than copper, coupler 314 may be configured to provide damping resistance to high frequency current which may be at or near the resonant frequency of the power converter 100. The copper layer 322 or 342 in each body 320 or 340 allows low frequency current to travel through coupler 314 relatively unimpeded.

Figure 5:
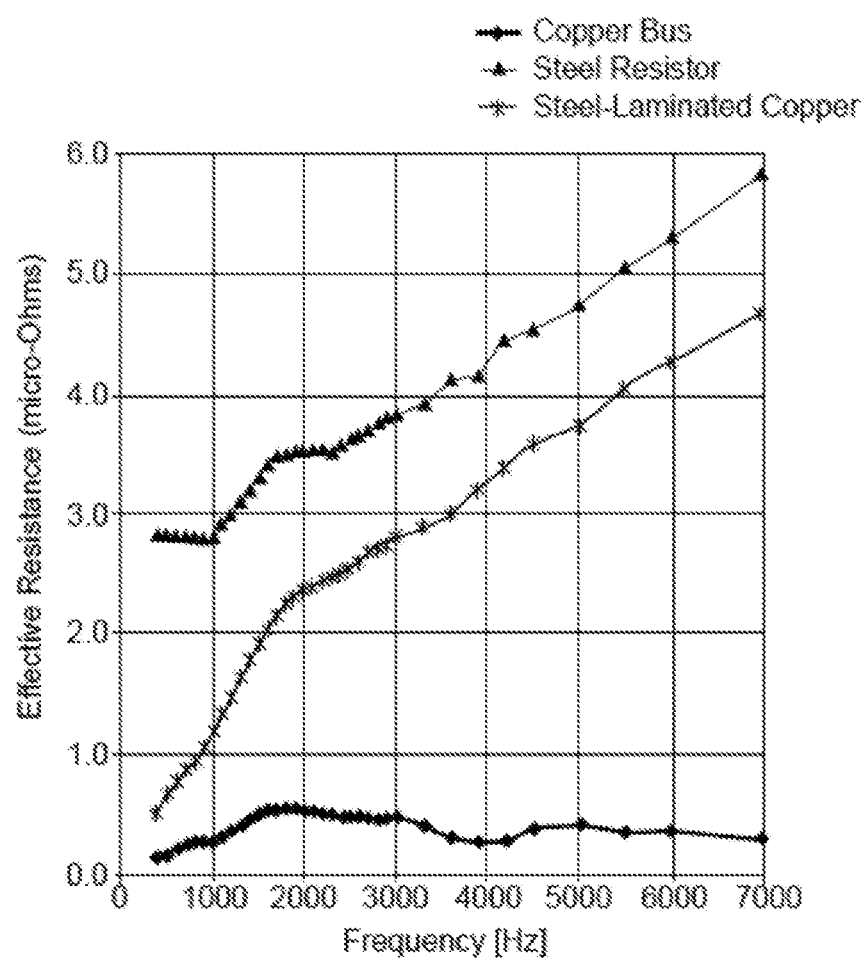
FIG. 5 shows frequency sweep test results of a conventional bus bar, a steel resistor, and the electrical coupler of FIG. 2.

FIG. 5 shows the results of a frequency sweep comparison test between a conventional copper bus bar, a steel resistor, and an electrical coupler according to the embodiment of FIG. 2. As may be appreciated in FIG. 5, the conventional copper bus bar exhibits an effective resistance which remains below 1.0 micro-Ohms across the tested frequency spectrum. The steel resistor exhibits an initial relatively constant effective resistance of approximately 2.8 micro-Ohms between 400 and 1000 Hz. The effective resistance then increases with frequency through 7000 Hz. In contrast, electrical coupler according to the embodiment of FIG. 4 provides an effective resistance which rises relatively linearly from 0.5 micro-Ohms at approximately 350 Hz through approximately 4.5 micro-Ohms at 7000 Hz. Also the resistance provided by the electrical coupler according to the embodiment of FIG. 2 is between the resistance provided by the copper bus bar and the steel resistor across the tested frequency spectrum.

FIG. 6 shows the results of a power loss comparison test between a bus bar including coupler 314 and a conventional bus bar. Note that for current near the resonant frequency of approximately 7 kHz (seven kilohertz) both the bus bar including coupler 314 and the conventional bus bar provide an equivalent resistance of about 3.7 milli-ohms. However, for low frequency or DC current flowing through each of the inner layers 322 and 342, the bus bar including coupler 314 provides a reduced resistance of approximately 90 micro-Ohms and the conventional bus bar provides a resistance of 3.7 milli-ohms (a ratio of approximately 40-to-1). The decreased resistance to low frequency or DC current flowing through the bus bar with coupler 314 provides a power loss savings in the positive bus bar of approximately 1110 Watts and in the negative bus bar of approximately 760 Watts for a total average heat load reduction of approximately 60%. In addition to reduced energy costs, this increase in efficiency allows for the installation of smaller heat transfer mechanisms thereby further reducing equipment costs, increasing safety, and improving reliability of the power converter.

The flow of current through coupler 314 is further facilitated by the three layer configuration shown in FIG. 4. Specifically, stray inductance of the first body 320 may cancel out or otherwise interact with the stray inductance of the second body 340 thereby causing the harmonic frequency of bus bar structure to be pushed away from the resonant frequency of the power converter 100. Accordingly, coupler 314 may decrease the total portion of current requiring damping resistance.

Figure 7:
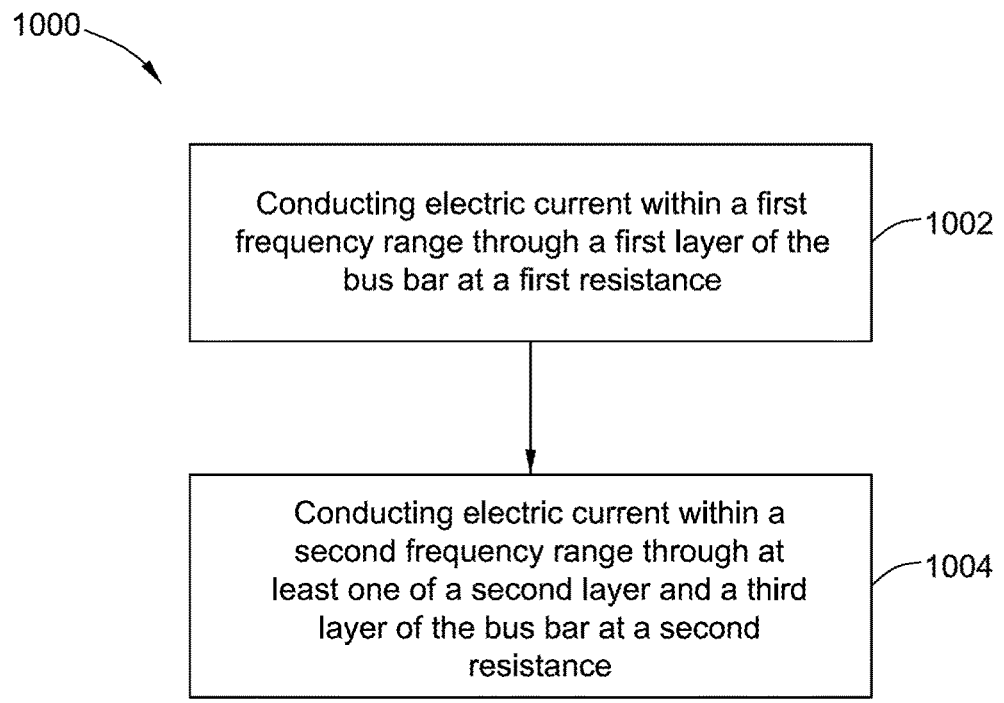
FIG. 7 shows a method according to another exemplary embodiment.

Accordingly, and as shown in FIG. 7, a method 1000 of conducting electrical current through a bus bar of a power converter may include conducting 1002 electric current within a first frequency range through a first layer of the bus bar at a first resistance and conducting 1004 electric current within a second frequency range through at least one of a second layer and a third layer of the bus bar at a second resistance. The electric current within the second frequency range may be conducted through both the second and third layers of the bus bar. In some embodiments, the method 1000 may further include causing an inductance in one of the second and third layers to force current in the other of the second and third layers away from the first layer. As described above, the first resistance may be lower than the second resistance. The first frequency range may be lower than the second frequency range, or overlap the second frequency range. The second and third layers may be connected to opposed first and second sides of the first layer, respectively. The first layer may include copper and the second and third layers may include steel. The first, second and third layers may have a rectangular cross-section.

In the embodiments of FIGS. 1 to 4, each of the electrical bodies has been provided with a rectangular cross section and three layers. However, an electrical body according to an embodiments of the present invention may be provided with other cross-sectional shapes, for example, a coupler may have a circular or polygonal cross section. Further, an electrical body may have less than three or more than three layers. For example, an electrical body having a circular cross-sectional shape may have an innermost layer having a hollow or solid cross-sectional shape while one or more outer layers may each be provided in an annular or ring shaped cross-sectional profile. Also, each layer may have a different cross-sectional profile, for example, an outer layer may have a polygonal or a faceted cross section, while an inner layer may have a circular or non-faceted cross-sectional profile.

Figure 8:
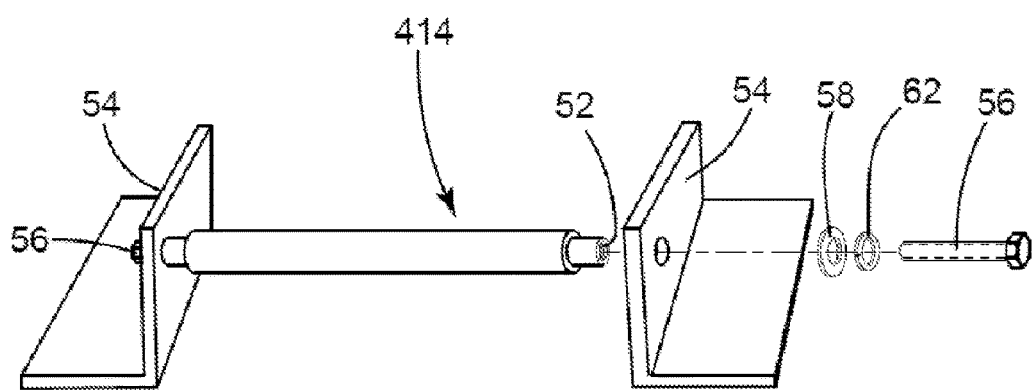
FIG. 8 shows an electrical coupler according to another exemplary embodiment of the invention.
Figure 9:
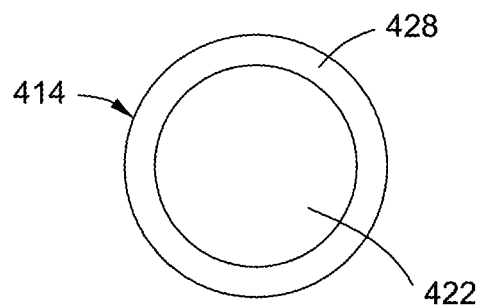
FIG. 9 shows a cross-sectional view of the electrical coupler shown in FIG. 8.

FIGS. 8 and 9 show an exemplary embodiment of a cylindrical electrical coupler 414 including an inner solid copper layer 422 and an outer steel layer 428. Each end of cylindrical coupler 414 includes a threaded hole 52. Coupler 414 may be fixed to a pair of support brackets 54 by a threaded fastener 56 provided with a fender washer 58 and lock washer 62. The configuration of cylindrical coupler 414 and brackets 54 allows coupler 414 to be readily replaced with another coupler having different characteristics.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. An electric coupler comprising:
a first body and a second body, each body comprising,
at least one inner layer and at least two outer layers, each layer being configured to receive a current;
wherein, the at least one inner layer is electrically connected on one side to a first outer layer of the at least two outer layers, and is electrically connected on an opposite side to a second outer layer of the at least two outer layers, each connection defining an interface between the inner layer and the first and second outer layers; and
wherein, the first body and the second body are connected via an insulator;
a first electrical path provided through a first material of the inner layer of the first body and the second body having a first resistance to an electric current within a first frequency range; and
a second electrical path provided through a second material of the first and second outer layers of the first body and the second body having a second resistance to an electric current within a second frequency range.

2. The electric coupler of claim 1, wherein, the first electrical path is defined by a first layer of the body having opposed first and second sides and the second electrical path is defined by at least one of a second layer and a third layer of the body, the second layer connected to the first side of the first layer and the third layer connected to the second side of the first layer.

3. The electric coupler of claim 2, wherein the second electrical path is defined by the second layer and the third layer.

4. The electric coupler of claim 2, wherein the first layer is configured such that an inductance in one of the second layer and die third layer forces current in die other of the second layer and the third layer away from the first layer.

5. The electric coupler of claim 2, wherein the first, second and third layers have a rectangular cross-section.

6. The electric coupler of claim 2, wherein the first layer includes copper and the second and third layers include, steel.

7. The electric coupler of claim 1, wherein the first frequency range overlaps the second frequency range.

8. The electric coupler of claim 1, wherein the first frequency range is lower than the second frequency range.

9. The electric coupler of claim 1, wherein the first resistance is lower than the second resistance.

10. A power converter, comprising:
an input stage configured to receive alternating or direct current;
an output stage configured to output alternating or direct current;
a voltage stabilizing capacitor between the input stage and the output stage, and a coupler, the coupler including, a first body;
wherein, the first body comprises at least one inner layer and at least two outer layers, each layer being configured to receive a current;
a first electrical path provided through a first material of the inner layer of the first body having a first resistance to an electric current within a first frequency range; and
a second electrical path provided through a second material of the first and second outer layers of the first body having a second resistance to an electric current within a second frequency range.

11. The power converter of claim 10, wherein the coupler further comprises, a second body;
a third electrical path provided through a first material of an inner layer of the second body having a third resistance to an electric current within a third frequency range; and
a fourth electrical path provided through a second material of a first and a second layer of the second body having a fourth resistance to an electric current within a fourth frequency range.

12. The power converter of claim 11, wherein the first electrical path is defined by the inner layer of the first body having opposed first and second sides, and the second electrical path is defined by at least one of the first outer layer and the second outer layer of the first body, the first outer layer connected to the first side of the inner layer and the second outer layer connected to the second side of the inner layer.

13. The power converter of claim 12, wherein the third electrical path is defined by the inner layer of the second body having opposed first and second sides, and the fourth electrical path is defined by at least one of the first outer layer and the second outer layer of the second body, the the first outer layer connected to the first side of the inner layer and the second outer layer connected to the second side of the inner layer.

14. The power converter of claim 13, wherein, the inner layer of the first body is configured such that an inductance in one of the first outer layer and the second outer layer of the first body forces current in the other of the first outer layer and the second outer layer of the first body away from the inner layer of the first body, and the inner layer of the second body is configured such that an inductance in one of the first outer layer and the second outer layer of the second body forces current in the other of the first outer layer and the second outer layer of the second body away from the inner layer.

15. The power converter of claim 11, wherein an insulator is disposed between the first body and the second body, and the insulator is configured such that an inductance in one of the first body and the second body cancels at least a portion of an inductance in the other of the first body and the second body.

16. The power converter of claim 11, wherein the inner layer of the first body, the first and second outer layers of the first body, the inner layer of the second body, and the first and second outer layers of the second body have a rectangular cross-section.

17. The power converter of claim 11, wherein the first frequency range overlaps second frequency range and the third frequency range overlaps the fourth frequency range.

18. The power converter of claim 11, wherein the first resistance is equal to the third resistance and the second resistance is equal to the fourth resistance.

19. The power converter of claim 10, wherein, in the first body and the second body, an input end and an output end of the first and second outer layers of the first body are electrically connected to a respective input end and a respective output end of the inner layer of the first body by at least one of welding, clamping, and fastening.

20. A method of conducting electrical current through a bus bar of a power converter, the method comprising:
- providing an electric coupler in series with the bus bar;
- wherein, the coupler includes a first body and a second body, each body having at least one inner layer and at least two outer layers, each layer being configured to receive a current;
- conducting an electric current within a first frequency range through a first layer of the bus bar at a first resistance; and
- conducting an electric current within a second frequency range through at least one of a second layer and a third layer of the bus bar at a second resistance.

* * * * *